FIG. I

March 16, 1954  G. H. COLLIER  2,672,220
WHEEL AND BRAKE COMBINATION
Filed Nov. 26, 1948  2 Sheets-Sheet 2

Inventor
GEORGE H. COLLIER

By

ATTORNEY

Patented Mar. 16, 1954

2,672,220

UNITED STATES PATENT OFFICE 2,672,220

WHEEL AND BRAKE COMBINATION

George H. Collier, Cuyahoga Falls, Ohio, assignor, by mesne assignments, to The Goodyear Tire & Rubber Company, a corporation of Ohio Application November 26, 1948, Serial No. 62,001

2 Claims. (Cl. 188—18)

This invention relates to wheel and brake combinations, and, more particularly, is concerned with a brake contained substantially within the confines of an associated wheel and capable of absorbing large amounts of kinetic energy.

It is the general object of the invention to provide a new and useful wheel and brake combination wherein the brake is contained substantially within the confines of a wheel but is capable of absorbing large amounts of kinetic energy.

Another object of the invention is the provision of a combination of the type described which is characterized by relatively light weight, so that it may be used on airplanes, which has high energy absorbing abilities so as to stop a heavy airplane within relatively short distances, and which is strong and durable and will operate over long periods with a minimum of attention and repair.

Another object of the invention is the provision of a brake and wheel assembly characterized by simplicity and inexpensiveness, and including hydraulically operated energizing means, the entire brake assembly being contained inside the wheel substantially within the confines of the sides of the wheel.

The foregoing objects of the invention, and other objects which will become apparent as the description proceeds, are achieved by the provision of a brake and wheel structure including a stationary axle, circular inboard and outboard flanges secured to the axle, bearings supported on the peripheries of the flanges, a divided wheel adapted to removably receive a tire and rotatably supported on the bearings, clamping lugs positioned at a circumferentially-spaced points around the inside periphery of the wheel to releasably clamp the wheel parts together, brake discs positioned between the flanges and having keyed driving engagement with the clamping lugs, a spider positioned between one of the flanges and a brake disc and slidably keyed to the axle, a second spider positioned between the brake discs and slidably keyed to the axle, blocks of friction material carried by the arms of the several spiders, and by the other flange and adapted to engage with the brake discs, and hydraulically-operated means carried by the said one flange for moving the friction material against the brake discs.

Figure 1:
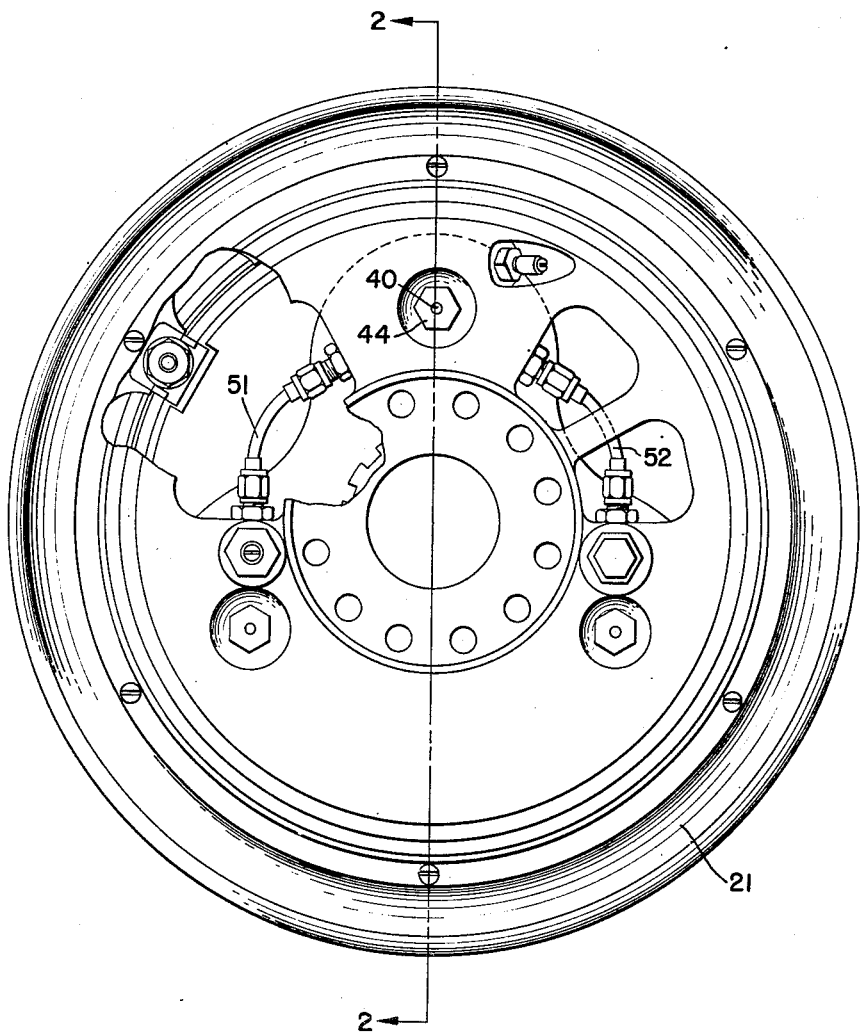
Figure 2:
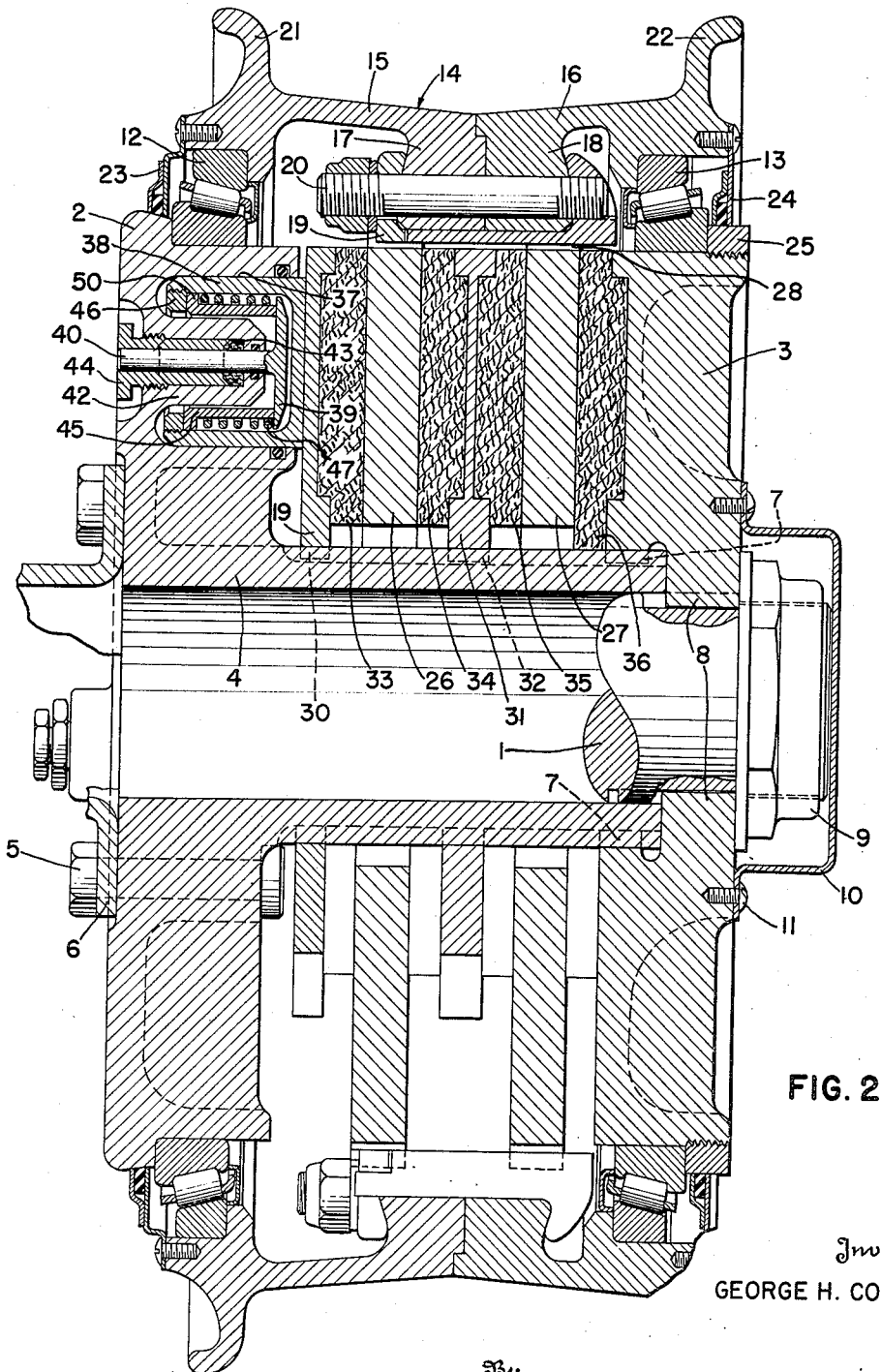

For a better understanding of the invention, reference should be had to the accompanying drawings, wherein:

Fig. 1 is a side elevation, partially broken away, of a wheel and brake assembly incorporating the principles of the invention; and Fig. 2 is a vertical cross-sectional view of the wheel and brake assembly of Fig. 1 as taken substantially on line II—II thereof.

In the drawings, the numeral 1 indicates a stationary axle which has secured to its inboard and outboard sides substantially circular flanges 2 and 3. In the particular embodiment of the invention, this is achieved by forming the flange 2 with a hub portion 4 which extends slidably over the axle 1, and with the hub portion 4 acting as a spacer between the flanges 2 and 3. To prevent rotary movement between the flanges 2 and 3, and the axle 1, the flange 2 may be bolted, as by bolts 5, to a torque flange 6 fastened to the axle 1, and, in addition, circumferentially-spaced tongue and groove connections 7 are provided between the inner periphery of one edge of the flange 3 and the end of the hub 4. Furthermore, the other side of the inner periphery of the flange 3 is formed with a plurality of tongue and groove connections 8 with the end of the axle 1, the entire assembly described being locked to the axle by a nut 9 screwed on the end of the axle and engaging with the flange 3, hub 4 and flange 2 to hold the assembly tightly against the torque flange 6. A cap 10 surrounds the nut 9 and is secured by screws 11 to the flange 3.

The outer peripheries of the substantially circular flanges 2 and 3 are formed to receive and support bearings 12 and 13 which, in turn, engage and support a divided wheel indicated as a whole by the numeral 14. Wheel 14 is divided near its center into parts 15 and 16, each of which has a substantially continuous rib, numbered 17 and 18, respectively, on its inner periphery about which circumferentially-spaced clamping lugs 19 can be secured by bolts 20 to removably clamp the wheel parts 15 and 16 together. The wheel 14 is formed with side flanges 21 and 22 adapted to engage with a pneumatic tire removably mounted on the wheel. Ring seals 23 and 24 carried by the wheel parts 15 and 16, respectively, are adapted to engage with the flanges 2 and 3, respectively, to protect the bearings 12 and 13. A lock ring 25 removably threaded on the flange 3 secures in place the bearing 13 and the remainder of the wheel assembly positioned upon the flanges 2 and 3.

Positioned between the flanges and adapted to be rotatably carried by the wheel 14 are one or more, usually two, brake discs 26 and 27. The rotatable brake discs 26 and 27 are preferably secured to the wheel 14 by utilizing the clamping lugs 19 which form keys received in key ways 28 positioned at circumferentially-spaced points around the outer peripheries of the brake discs 27 and 26, whereby the brake discs are carried with the wheel 14, but are free to move axially with respect thereto. It will be noted that the brake discs are substantially equal in diameter to the flanges 2 and 3.

Mounted adjacent one of the circular flanges, for example, the flange 2, is a spider 29 having its center portion axially splined at 30 to the hub 4, and having usually three circumferentially-spaced arm portions extending radially outwardly a distance substantially equal to the diameter of the brake discs 26 and 27. Positioned between the brake discs 26 and 27 is a second spider 31 having its central portion axially splined, at 32, to the hub 4, and formed with the same number of arm portions as the spider 29, the arm portions of the several spiders being in alignment with each other. Secured to the spiders 29 and 31, and to the other flange, namely flange 3, are blocks 33, 34, 35 and 36 of friction material, these blocks usually being in the form of circular disks having portions of reduced diameter received in sockets formed in the members supporting them, the blocks of friction material being adapted to be engaged with opposed side faces of the brake discs 26 and 27 upon the application of braking power to the assembly.

Hydraulic mechanisms are utilized to supply braking power to the assembly, such mechanisms ordinarily comprising three hydraulic cylinders associated with the flange 2, the cylinders being spaced circumferentially around the flange in alignment with the spider arms and having pistons adapted to engage with each arm of the spider 29. More particularly, the flange 2 is appropriately machined to provide a cylinder 37 which slidably receives a piston 38. A small circular plate 39 is positioned inside the head of the piston, the plate 39 being fastened to a stem 40 carried inside of a boss 42 likewise extending inside of the piston. The boss 42 carries packing 43 adapted to be compressed by nut 44 so that a desired pressure is applied by the packing against the stem 40 to normally hold the stem 40 by friction in a fixed position. A spacer sleeve 45 is carried between the plate 39 and a shoulder ring 46 fixed to the inside of the skirt of the piston 38 and a compression spring 47 carried by the spacer sleeve 45 engages between the plate 39 and a shoulder 50 on the end of the spacer sleeve 45.

The piston and cylinder arrangement described provides for automatic repositioning of the piston upon the occasion of wear of the blocks 33, 34, 35 and 36 of friction material in the use of the brake so that the same amount of brake pedal travel will effect the braking action. More specifically, with the parts in the position illustrated in Fig. 2, which shows the assembly just after hydraulic braking pressure has been applied to the pressure cylinders, the release of the brake pedal will result in the compression spring 47 moving the spacer sleeve 45 backwardly, that is to the left, to move the piston 38 in this direction until the inside of the piston engages with the plate 39. At this time, there is no braking pressure between the blocks of friction material and the brake discs and the wheel will turn freely.

On the other hand, as the pressure is reapplied to the cylinder 37 behind the piston 38, the piston will move outwardly to engage with the arms of the spider 29 and reapply the braking pressure between the blocks of friction material and the brake discs. As the piston 38 moves outwardly, the shoulder 46 picks up the spacer sleeve 45 and moves it towards the plate 39 compressing the spring 47. Ordinarily, the clearance between the end of the spacer sleeve 45 and the plate 39 is sufficient to allow the application of the braking pressure to the brake discs. However, as the blocks of friction material become worn, then the piston 38 will have to move outwardly farther to effect the braking pressure and the end of the spacer sleeve 45 will engage with the plate 39 and the pressure on the plate will be such as to overcome the frictional resistance of the packing 43 on the stem 40 and the plate 39 will be moved outwardly of the boss 42 to a new position. When this occurs, the return movement of the piston 38 into the cylinder 37 will not be so great inasmuch as the piston will strike the repositioned plate 39 sooner. In this way, the travel of the pistons 38 to effect braking pressures on the brake discs is always substantially the same regardless of the degree of wear on the blocks of friction material.

It will be understood that all three of the hydraulic cylinders positioned at circumferentially spaced points around the flange 2 operate in a similar manner, and operate simultaneously. The simultaneous operation of the several hydraulic cylinders is achieved by connecting the cylinders together for simultaneous operation by means of conduits 51 and 52.

From the foregoing, it will be recognized that the various objects of the invention have been achieved by the provision of a relatively light weight, but strong and durable wheel and brake assembly characterized by compactness of the brake unit which is positioned substantially within the confines of the wheel. The brake unit has high energy absorbing capacity and is long wearing and durable substantially without maintenance or repair.

While certain representative embodiments and details have been shown for the purpose of illustrating the invention, it will be apparent to those skilled in this art that various changes and modifications may be made therein without departing from the spirit or scope of the invention.

I claim:

1. A brake and wheel combination including a stationary axle, circular inboard and outboard hub flanges, a hub spool positioned between the flanges, the hub flanges and spool being mounted on and secured to the axle, bearings supported on the peripheries of the flanges, a divided wheel adapted to removably receive a tire and rotatably supported on the bearings, clamping lugs positioned at circumferentially-spaced points around the inside periphery of the wheel to releasably clamp the wheel parts together, brake discs positioned between the flanges and having keyed driving engagement with the clamping lugs, a spider positioned between one of the flanges and a brake disc and slidably keyed to the hub spool, a second spider positioned between the brake discs and slidably keyed to the hub spool, blocks of friction material carried by the arms of the several spiders and by the other flange and adapted to engage with the brake discs, and a plurality of hydraulically operated means carried by the said one flange at circumferentially-spaced points for moving the friction material against the brake discs.

2. A wheel and brake assembly comprising an axle, circular flanges secured to the axle at spaced points thereon, a wheel journaled on the flanges, brake discs of substantially the same diameter as the flanges slidably keyed to the inside of the wheel and positioned between the flanges, circular blocks of friction material, means positioned between the brake discs and supporting the blocks of friction material at circumferentially spaced points for engagement with the brake discs, said means being secured against rotation relative to the axle and flanges but being axially slidable with respect thereto, circular blocks of friction material carried by one of the flanges at circumferentially spaced points thereon and in alignment with the aforesaid blocks, means adjacent and axially slidable with respect to the other of said flanges but secured against rotation relative thereto, circular blocks of friction material carried by the last-named means at circumferentially spaced points in alignment with the aforesaid blocks, a plurality of hydraulically actuated pistons carried on said other flange at circumferentially spaced points in alignment with the blocks of friction material, and means for simultaneously actuating the pistons to apply the brake.

GEORGE H. COLLIER.

References Cited in the file of this patent

UNITED STATES PATENTS

| Number | Name | Date |
|---|---|---|
| 1,927,995 | Stanley | Sept. 26, 1933 |
| 2,054,583 | Delaval-Crow | Sept. 15, 1936 |
| 2,071,788 | Gillett | Feb. 23, 1937 |
| 2,097,942 | Whitney | Nov. 2, 1937 |
| 2,267,263 | Berger et al. | Dec. 23, 1941 |
| 2,381,166 | Hollerith | Aug. 7, 1945 |
| 2,392,970 | Bricker | Jan. 15, 1946 |
| 2,417,855 | Barish | Mar. 25, 1947 |
| 2,486,144 | Frank | Oct. 25, 1949 |
| 2,616,525 | DuBois | Nov. 4, 1952 |

FOREIGN PATENTS

| Number | Country | Date |
|---|---|---|
| 251,130 | Great Britain | Apr. 29, 1926 |
| 330,065 | Great Britain | June 5, 1930 |
| 482,791 | Great Britain | Apr. 5, 1938 |